(12) United States Patent
Anderson et al.

(10) Patent No.: US 8,856,725 B1
(45) Date of Patent: Oct. 7, 2014

(54) AUTOMATED SOURCE CODE AND DEVELOPMENT PERSONNEL REPUTATION SYSTEM

(75) Inventors: Keith H. Anderson, Bainbridge Island, WA (US); Christopher J. Heino, Jr., Seattle, WA (US); Daniel D. Allen, Seattle, WA (US); Michael V. Zampani, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 35 days.

(21) Appl. No.: 13/215,881

(22) Filed: Aug. 23, 2011

(51) Int. Cl.
*G06F 9/44* (2006.01)

(52) U.S. Cl.
USPC .......................................... 717/103

(58) Field of Classification Search
USPC ................. 717/120–124, 126–127, 100–103; 726/19; 709/223; 705/7.11, 7.36, 7.39, 705/7.41; 707/999.102
See application file for complete search history.

(56) References Cited

U.S. PATENT DOCUMENTS

| | | | | |
|---|---|---|---|---|
| 8,332,392 | B2 * | 12/2012 | Brzozowski et al. | 707/722 |
| 2002/0161778 | A1 * | 10/2002 | Linstedt | 707/102 |
| 2006/0123389 | A1 * | 6/2006 | Kolawa et al. | 717/101 |
| 2008/0155508 | A1 * | 6/2008 | Sarkar et al. | 717/126 |
| 2008/0301639 | A1 * | 12/2008 | Bell et al. | 717/120 |
| 2011/0208684 | A1 * | 8/2011 | Dube et al. | 706/52 |
| 2011/0276354 | A1 * | 11/2011 | Bijani et al. | 705/7.11 |
| 2012/0272205 | A1 * | 10/2012 | Fox et al. | 717/101 |

* cited by examiner

*Primary Examiner* — Tuan A Vu
(74) *Attorney, Agent, or Firm* — Hope Baldauff, LLC (57) ABSTRACT

Technologies are described herein for providing an automated reputation system for source code and software development personnel. Code quality metrics regarding code changes associated with a code artifact are automatically generated in response to development lifecycle events in a development environment. The code quality metrics are collected and utilized by a reputation engine to compute a code reputation score for the code artifact. The reputation engine may further utilize the collected code quality metrics to compute personnel reputation scores for one or more development personnel related to the code changes, such as developers, reviewers, testers, and the like. In addition, ratings regarding the code artifact may be received from development personnel in the development environment, and these ratings may be further considered in the computation of the code reputation score for the code artifact and the personnel reputation scores of the related development personnel.

20 Claims, 4 Drawing Sheets

FIG. 4 the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, electronic book readers, wireless telephone devices, special-purposed hardware devices, network appliances, or the like. The embodiments described herein may also be practiced in distributed computing environments, where tasks are performed by remote processing
AUTOMATED SOURCE CODE AND DEVELOPMENT PERSONNEL REPUTATION SYSTEM

BACKGROUND

The development environment for a large, enterprise software application may have a very large number of source code components stored in a source code repository. In addition, these source code components may have been modified multiple times throughout the evolution of the software application. The source code repository may contain source code components that provide examples of good or bad code, or are representative of best practices for specific situations or design patterns. However, locating these examples or best practices may be difficult in a large software repository, because the evaluation of the source code component as a good (or bad) example may rely solely on the subjective opinion of the personnel searching the code.

The development environment may provide a simple ratings system allowing development personnel to rate various code artifacts and other source code components in the source code repository. These ratings could then be used to identify the best and worst components to use as example code, as well as to develop best practices. However, these ratings similarly rely solely on the subjective opinions of the personnel rating the code, and do not take into account the objective quality and/or success of the code in the development/production environment, or the qualifications of the person providing the ratings.

It is with respect to these and other considerations that the disclosure made herein is presented.

DETAILED DESCRIPTION

The following detailed description is directed to technologies for providing an automated reputation system for source code and software development personnel. Utilizing the technologies described herein, a software development environment may compute and store reputation scores for source code artifacts, such as modules, files, functions, lines of code, and the like, as well as development personnel, such as software developers, code reviewers, testers, and the like. The reputation scores may be determined from data collected automatically from development lifecycle events, from which information such as who coded a particular code artifact, how many times has the artifact been changed, who reviewed the code artifact, how many times did the artifact go back and forth between the coder and reviewer during development, how did the artifact fare in unit testing, what were the results from any static code analysis, did the code artifact build correctly, did the code artifact deploy successfully, has the particular code artifact failed in the production environment, and the like may be determined. The reputation scores may also be determined from code ratings supplied by development personnel regarding the code artifact, along with the rater's own reputation score.

The code artifact reputation scores may allow development personnel to develop libraries of good (and bad) code examples, locate example source code for a specific coding problem, facilitate the determination of source code that may need to be deprecated or refactored, generate heatmaps of good code versus bad code across the software system, discover out-of-date techniques and new best practices, and factor into the calculation of coder/tester/reviewer reputation scores. In addition, the development personnel reputation scores may allow for recognition for good developers, testers, and code reviewers, facilitate a code quality reward system, allow developers to identify experts in the organization in a particular technical area, automatically generate code review groups based on personnel with a good reputation of reviewing a particular type of code, and identify personnel to facilitate interviewing, hiring, mentoring, and evaluating other developers.

According to embodiments, code quality metrics regarding code changes associated with a code artifact are automatically generated in response to development lifecycle events in the development environment. The code quality metrics are collected and utilized by a reputation engine to compute a code reputation score for the code artifact. The reputation engine may further utilize the collected code quality metrics to compute personnel reputation scores for one or more development personnel related to the code changes, such as developers, reviewers, testers, and the like. In addition, ratings regarding the code artifact may be received from development personnel in the development environment, and these ratings may be further considered in the computation of the code reputation score for the code artifact and the personnel reputation scores of the related development personnel.

It should be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
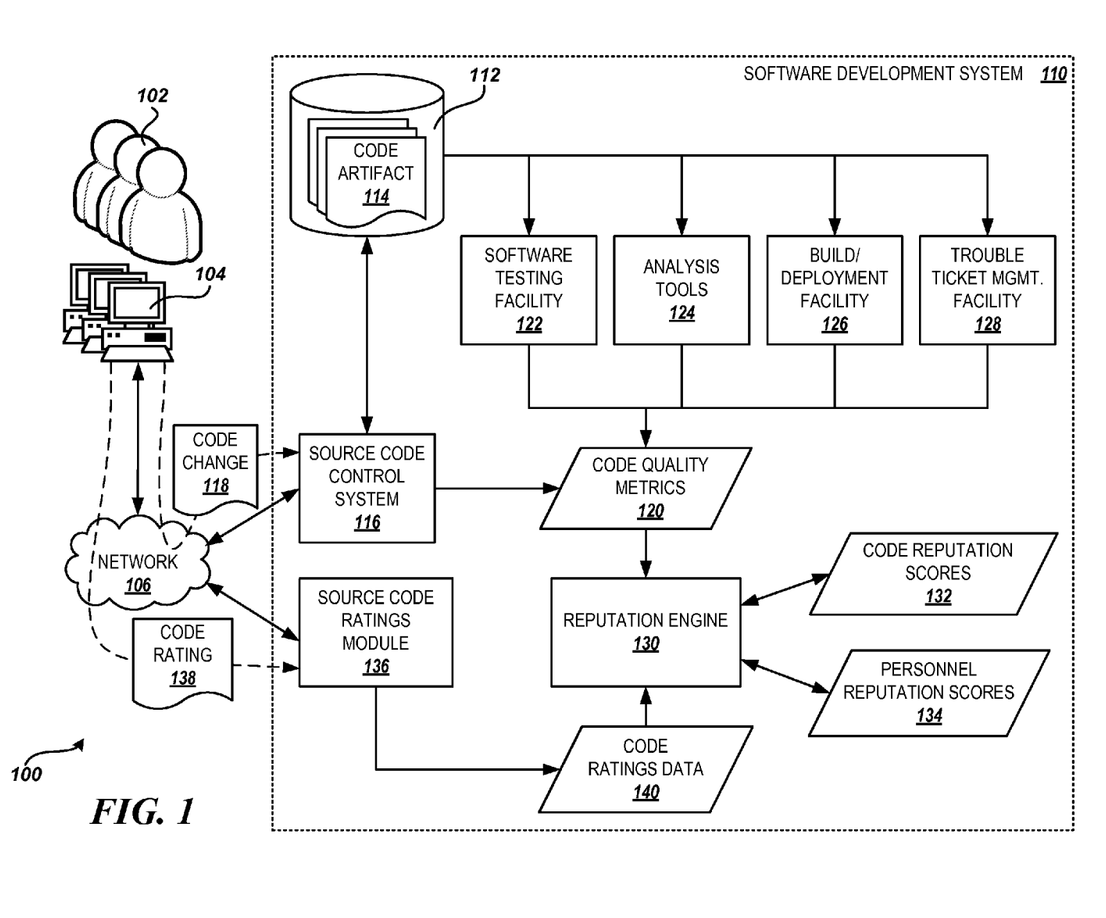
FIG. 1 is a system diagram showing aspects of an illustrative operating environment for providing an automated reputation system for source code and software development personnel, including several software and hardware components provided by embodiments presented herein.

FIG. 1 and the following description are intended to provide a brief, general description of a suitable computing environment in which the embodiments described herein may be implemented. In particular, FIG. 1 is a system and network diagram that shows an illustrative operating environment 100 including several software components for providing an automated reputation system for source code and software development personnel. The environment 100 includes a plurality of software/system development personnel 102 that use development workstations 104 to access a software development system 110 across a network 106. The development personnel 102 may include software developers, code reviewers, software testers, project managers, system administrators, and other personnel responsible for the development and maintenance of a software system.

The development workstations 104 may be a personal computer ("PC"), a desktop workstation, a laptop, a notebook, a personal digital assistant ("PDA"), an electronic-book reader, a game console, a set-top box, a consumer electronics device, a server computer, or any other computing device capable of connecting to the network 106 and communicating with the software development system 110. The network 106 may comprise a local-area network ("LAN"), a wide-area network ("WAN"), the Internet, or any other networking topology or combination of topologies known in the art that connects the development workstations 104 to the software development system 110. The software development system 110 may comprise application servers, database servers, Web servers, and other computing and storage devices that provide development lifecycle services to the development personnel 102. The software development system 110 may be implemented by a company or organization to provide development lifecycle services to internal development personnel 102, or the software development system may be implemented in "the cloud" to provide services to a variety of organizations across the Internet or other networks 106.

According to embodiments, the software development system 110 includes a source code repository 112. The source code repository 112 stores code artifacts 114 comprising source code components of application software system(s). The code artifacts 114 may represent source code files, modules, object definitions, methods, functions, groups or lines of code, or any combination of these and other source code components. The source code repository 112 may further store change history and revisions to the code artifacts, software revision and version labels, code dependencies, build scripts, and the like for the software systems. The source code repository 112 may be maintained by a source code control system 116. The source code control system 116 may be a component of a software configuration management system, such as RATIONAL CLEARCASE® from IBM Corporation of Armonk, Tex., for example. The source code control system 116 may also be a proprietary system implemented by the software development system 110.

For example, software development personnel 102 may utilize the source code control system 116 to "check-in" a code change 118 into the source code repository 112. The code change 118 may comprise a new code artifact 114, or may represent a change to an existing code artifact in the source code repository 112. The software development personnel 102 may utilize the source code control system 116 to check-out a code artifact 114 from the source code repository 112, modify a portion of the code, and then check-in the modified code. In one embodiment, the source code control system 116 tracks the individual code changes 118 made to the code artifacts 114 in the source code repository 112 through the use of a specific identifier, such as a change list number ("CLN"). In addition, the CLN may be utilized to identify individual code changes 118 throughout the development lifecycle, including code review, testing, build and deployment, and operation in the production environment. The source code repository 112 may further maintain the relationships between code changes 118 and any associated code artifact(s) 114.

According to embodiments, code quality metrics 120 are collected for code artifacts 114 and/or other source code components of the software system. In one embodiment, the code quality metrics 120 may be tracked by CLN as related to a specific code change 118. Code quality metrics 120 regarding a specific code change 118 may be collected throughout the development lifecycle of the code change and/or associated code artifact(s) 114, from development and review, to testing, build and deployment, and operation in production. The code quality metrics 120 may include data regarding development, review, and revision of the code change 118, such as the identity of the software development personnel 102 who checked-in the code change 118, the identity of the software development personnel 102 who reviewed the code change, the number of times the code was revised during the review process, and the like. Such code quality metrics 120 may be provided by the source code control system 116, for example.

The code quality metrics 120 may further include data regarding unit and/or system testing of the code change 118 and/or associated code artifact(s) 114, such as the identity of the software development personnel 102 performing the testing, automated test results, iterations of modification and retesting throughout the testing process, and the like. These code quality metrics 120 may be provided by the source code control system 116 and/or an automated software testing facility 122 provided by the software development system 110, for example.

In another embodiment, the code quality metrics 120 may include results of analysis performed on the code change 118 and/or associated code artifact(s) 114 by analysis tools 124 used in the software development or production system 110. The analysis tools 124 may include static analysis tools that analyze the code for common bug patterns, such as variable overflow, improper intrinsic typecasts, mismatched nesting structures, endless loops, use of deprecated methods or properties, unhandled boundary conditions, and the like. For example, the analysis tools 124 may include the FIND-BUGS™ program from the University of Maryland of College Park, Md. The analysis tools 124 may also include dynamic analysis tools that analyze the code during stress testing or while running in production to identify potential performance metrics or problems, such as transaction times, number of database locks, memory usage, number of remote service calls, number of garbage collection cycles, and the like. For example, the analysis tools 124 may include the BOUNDSCHECKER from Micro Focus IP Development Limited of Newbury, Berkshire, UK. The analysis tools 124 may automatically perform analysis of a code change 118 when the code change is checked-into the source code repository 112, during testing of the associated code artifact(s) 114, during a build of the software system, when a version of the software containing the code change is deployed to production, when the code is executed in production, and the like.

The code quality metrics 120 may further include data regarding build and deployment events for the code change 118 and/or associated code artifact(s) 114, such as whether a build of a version of the software system containing the code change was successful, whether further modifications were required to the code in order to deploy the version, whether the version was successfully deployed or had to be rolled-back, and the like. These code quality metrics 120 may be provided by a build/deployment facility 126 provided by the software development system 110, for example.

The code quality metrics 120 may also include data regarding operation of the code change 118 and/or associated code artifact(s) 114 in the production environment. For example, a trouble ticket management facility 128 may be used to track problems or failures in production, and manage the priority of fixes for these failures. The trouble ticket management facility 128 may track trouble tickets automatically identified by alarms in the production environment, manually entered by administrative personnel, manually entered by customers/users of the software system, and the like. In the management of a trouble ticket, the section or sections of code in the software system where the problem arises may be identified, and the number of failures caused by a particular code change 118 or occurring in a particular code artifact 114 may be further tracked in the code quality metrics 120, according to one embodiment. For example, the module causing the problem may be correlated back to one or more particular CLNs corresponding to code changes 118 by looking at the version or revision of the module in which the problem was introduced, and then identifying the CLN or CLNs tied to that revision of the module.

According to embodiments, the software development system 110 further includes a reputation engine 130. The reputation engine 130 may utilize the code quality metrics 120 and other inputs to compute code reputation scores 132 for code artifacts 114 and/or other source code components in the source code repository 112. The reputation engine 130 may be implemented as a standalone module in the software development system 110 or as part of a software configuration management system, for example. The reputation engine 130 may be implemented in software, hardware, or any combination of the two.

In one embodiment, the reputation engine 130 utilizes the code quality metrics 120 collected in regard to all code changes 118 associated with a particular code artifact 114 in the source code repository 112 to compute the code reputation score 132 for that code artifact. The code quality metrics 120 for all code changes 118 associated with the code artifact 114 may be considered equally, or the code quality metrics for the most recent code changes may be weighted more heavily in the computation of the code reputation score 132. For example, when a particular code change 118 is deployed to production, code quality metrics 120 regarding whether the deployment was successful, whether new bugs were introduced, or whether the deployment forced a rollback are collected and associated with the CLN of the code change. These code quality metrics 120 will figure positively or negatively in the code reputation scores 132 computed for the code artifact(s) 114 associated with the code change 118 in the source code repository 112.

In another embodiment, the reputation engine 130 may further use the code quality metrics 120 to compute personnel reputation scores 134 regarding development personnel 102 in the environment 100. For example, if a particular code change 118 is deployed to production, and the deployment must then be rolled back due to bugs in the code, the code quality metrics 120 regarding this event may weigh negatively towards the personnel reputation score 134 regarding the development personnel 102 that developed the offending code, as determined from an association of that developer with the code change in the source code repository, for example. In addition, the code quality metrics 120 regarding this event may further weigh negatively towards the personnel reputation score 134 of the development personnel 102 who reviewed the code, those who tested it, and the like.

The personnel reputation scores 134 may comprise a single, overall reputation score for each of software development personnel 102, or each person may have separate scores in the various software development roles that they place in the software development environment 100, such as developer, code reviewer, software tester, and the like. In another example, a particular code change 118 may be checked-into the source code repository 112 and then go through several iterations with a code reviewer or several rounds of unit testing requiring modifications to the code to complete testing. The code change 118 may then be successfully deployed into production, and not experience any subsequent failures. Code quality metrics 120 regarding the code change 118 and/or the associated code artifact(s) 114 will be collected for each of these events. The collected code quality metrics 120 may result in a lower code reputation score 132 for the associated code artifact 114 as well as a lower personnel reputation score 134 for the original developer being computed by the reputation engine 130. However, these code quality metrics 120 may also weigh in favor of higher personnel reputation scores 134 being computed by the reputation for the code reviewer and/or software tester responsible for reviewing and testing the code change. Alternatively or additionally, the code reputation score 132 for the associated code artifact 114 and personnel reputation score 134 for the original developer may depend primarily on the quality of the last change checked-in and deployed successfully to production.

In further embodiments, the software development system 110 may include a source code ratings module 136. The source code ratings module 136 may accept code ratings 138 regarding code artifacts 114 and/or other source code components in the source code repository 112 from development personnel 102 and store them in code ratings data 140. The source code ratings module 136 may be implemented as a standalone module in the software development system 110 or as part of a software configuration management system, for example. The source code ratings module 136 may be implemented in software, hardware, or any combination of the two.

The code ratings 138 may include a quantitative rating for the code artifact 114, such as a conventional "star rating," one or more tags for the code to be used for searching the source code repository 112, a qualitative analysis of the code, such as one or more comments like "this code is a great example of the definition of a singleton in Java," and the like. The source code ratings module 136 may then combine the code ratings 138 regarding a particular code artifact 114 together in the code ratings data 140. In one embodiment, the combined quantitative ratings for a code artifact 114 in the code ratings data 140 are further utilized by the reputation engine 130 along with the code quality metrics 120 in the computation of the code reputation score 132 regarding the code artifact. In another embodiment, the weight given the various code ratings 138 in the code ratings data 140 in the computation of the code reputation score 132 for a code artifact 114 may depend on the personnel reputation score 134 of the developer personnel providing the code rating. According to a further embodiment, the impact of a particular code rating 138 may decay over time, in recognition that the art of coding is always evolving.

Additionally or alternatively, the reputation engine 130 may calculate a personnel reputation score 134 regarding development personnel 102 in the role of code rater from the code ratings data 140 and the code reputation scores 132 regarding the same code artifacts 114. For example, if a particular developer provides a code rating 138 indicating that a particular code artifact 114 has a five-star rating, and that code artifact has a high code reputation score 132 as calculated by the reputation engine 130 from the code quality metrics, then this may weigh in favor of the developer having a higher personnel reputation score 134 in regard to the role of code rater. According to one embodiment, the weight given to a particular code rating 138 from a developer in the computation of that developer's personnel reputation score 134 may diminish over time. In addition, after a particular code artifact 114 has received a number of good or bad code ratings 138, subsequent code ratings with a similar assessment may be given less weight in the computation of the personnel reputation score 134 for the code rater and/or the code reputation score 132 for the code artifact.

It will be appreciated that the reputation engine 130 may use various combinations of the code quality metrics 120, the code ratings data 140 and the personnel reputation scores 134 to compute the code reputation scores 132 for the code artifacts 114 and/or other source code components in the source code repository 112. Similarly, the reputation engine 130 may use various combinations of the code quality metrics 120, the code ratings data 140 and the code reputation scores 132 to compute the personnel reputation scores 134 for the development personnel 102 in the environment. It is intended that this application include all such combinations.

It will be further appreciated that the code reputation scores 132 and the personnel reputation scores 134 may improve the searching capability of the source code repository 112 for development personnel 102 in the software development environment 100. The development personnel 102 may search for tags provided in code ratings 138 or keywords in the code itself to locate code artifacts 114 in the source code repository 112, and sort the returned artifacts by their respective code reputation scores 132. In addition, the development personnel 102 performing the search may further be able to see the personnel reputation scores for anyone who has touched the code artifacts, including the developer that originally checked-in the code artifact, developers that have made subsequent changes to the code, the personnel who reviewed the code, the testers that tested the code, and the like.

In a further embodiment, the source code ratings module 136 may provide development personnel 102 with the ability to tag code artifacts 114 in the source code repository 112 with a design pattern or patterns in addition to providing a code rating 138. The development personnel 102 may select the design pattern tag(s) from a pre-defined list of design patterns and/or may add new design patterns as needed. For example, the development personnel 102 may tag a particular code artifact 114 as a definition of a singleton or as a transformation of an XML file using an XML style-sheet. The design pattern tags may facilitate additional searching of the source code repository 112. For example, a developer may search the source code repository 112 for code artifacts 114 that are tagged as singleton definitions, and sort the results based on the code reputation scores 132 of the selected code artifacts in order to select the best singleton definition design patterns from the source code repository to be used as sample code for further development.

In addition, the software development system 110 may periodically perform such a search of the source code repository 112 for all of the pre-defined design patterns in order to create and maintain a library of the best (and worst) code samples and best practices. The code artifacts 114 with the highest and/or lowest code reputation scores 132 for certain tagged design patterns may also be used in automating the code review process to potentially catch situations where a code change 118 does not follow best practices or introduces code that is likely to cause problems in the environment 100. This may provide for better pre-testing analysis than that performed by the analysis tools 124, because it may also provide a coaching opportunity during the code review process.

In another embodiment, code quality metrics 120 may not be collected and code reputation scores 132 may not be computed for automatically generated code, such as code generated by development tools, database design tools, testing tools, and the like. Additionally, a developer or other software development personnel 102 may be able to mark certain code artifacts 114 in the source code repository 112 as "do not affect reputation." This may be useful when a particular code change 118 is being done for sake of expediency but may not represent the most efficient or eloquent approach to solve the problem (i.e. when the code change is a "quick and dirty hack").

It will be appreciated that the calculations utilized by the reputation engine 130 in calculating the code reputation scores 132 and personnel reputation scores 134 may be adjusted over time as additional code quality metrics 120 and/or code ratings data 140 are collected, and the impact of these values on the reputation scores are assessed. For example, if the influence of a particular code quality metric 120 on a code reputation score 132 is frequently out-of-synch with the code ratings 138 supplied by development personnel 102 for the same code artifacts 114, then the weight given that code quality metric 120 in the calculation of the code reputation score may be reduced in the calculations. In addition, the balance between the influence of the automatically generated code quality metrics 120 and the manually supplied code ratings 138 on reputation scores may be adjusted periodically, depending upon which of the two is perceived to be the best predictor of code quality over time. This function may be performed manually by system administration personnel, or there may be algorithms implemented in the reputation engine 130 that allow the reputation engine to adjust its calculations based on inconsistencies or other triggers indicated by the data.

Figure 2:
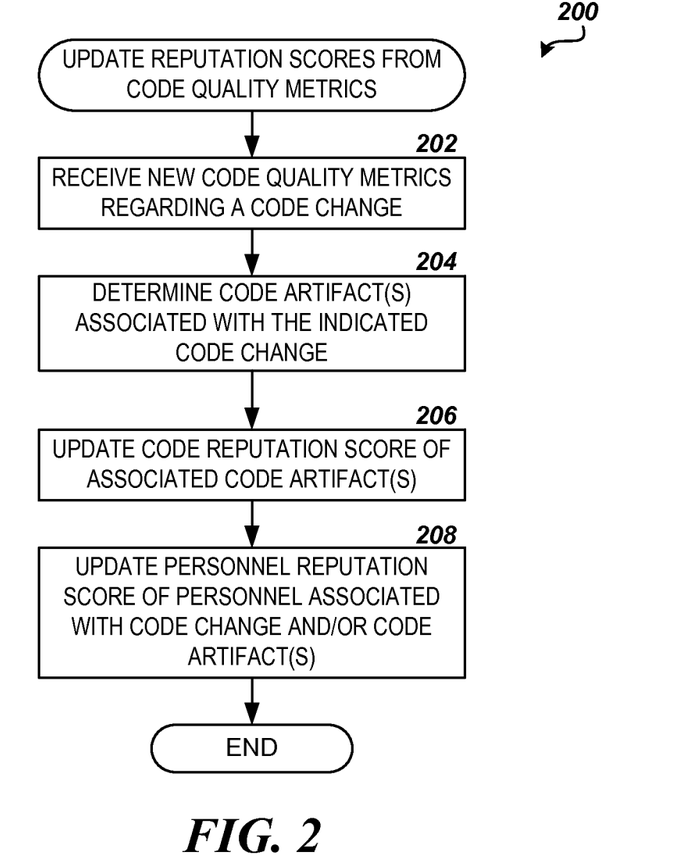
FIG. 2 is a flow diagram showing a method of updating code reputation scores and/or personnel reputation scores from automatically generated code quality metrics, according to embodiments described herein.
Figure 3:
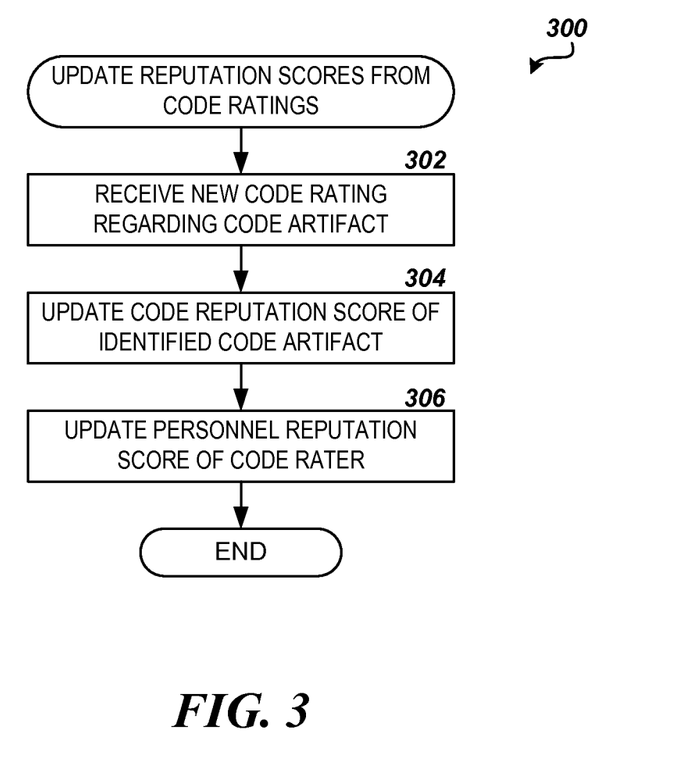
FIG. 3 is a flow diagram showing a method for updating code reputation scores and/or personnel reputation scores from code ratings provided by development personnel, according to embodiments described herein.

Turning now to FIGS. 2 and 3, additional details will be provided regarding the embodiments described herein for providing an automated reputation system for source code and software development personnel. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 2 illustrates one routine 200 for updating code reputation scores 132 and/or personnel reputation scores 134 from automatically generated code quality metrics 120, according to one embodiment described herein. For example, the routine 200 may be performed when new code quality metrics 120 are received from the source code control system 116 or other development facilities in the software development system 110. The routine 200 may be performed by the reputation engine 130, as described above in regard to FIG. 1. It will be appreciated that the routine 200 may also be performed by other modules or components executing on the application servers in the software development system 110, or by any other combination of modules and components.

The routine 200 begins at operation 202, where the reputation engine 130 receives new or updated code quality metrics 120. As described above in regard to FIG. 1, new code quality metrics 120 may be generated automatically as the result of various events that occur through the development lifecycle of the software system, from development and review of code, to testing, build and deployment, and operation in production. According to one embodiment, the code quality metrics 120 may be related to a particular CLN corresponding to a specific code change 118. The received code quality metrics 120 may include data regarding development, review, and revision of the code change 118 received from the source code control system 116, data regarding unit and/or system testing of the code change and/or associated code artifact(s) 114 received from the automated software testing facility 122, the results of static analysis performed on the code change and/or associated code artifact(s) by the analysis tools 124, data regarding build and deployment events for the code change received from the build/deployment facility 126, data regarding failure of the code change and/or associated code artifact(s) in the production environment from the trouble ticket management facility 128, and the like.

The routine 200 proceeds from operation 202 to operation 204, where the reputation engine 130 determines which code artifacts 114 in the source code repository 112 are associated with the code change 118 identified by the CLN, i.e. to which files, modules, objects, functions, and/or methods were the indicated code changes applied. As described above, the source code repository 112 may further maintain the relationships between code changes 118 and any associated code artifact(s) 114.

From operation 204, the routine 200 proceeds to operation 206, where the reputation engine 130 updates the code reputation scores 132 regarding each of the identified code artifacts 114 associated with the code change 118. As further described above in regard to FIG. 1, the reputation engine 130 may utilize the code quality metrics 120 collected in regard to all code changes 118 associated with the code artifact 114 to compute the code reputation score 132 for that code artifact. The code quality metrics 120 for all code changes 118 associated with the code artifact 114 may be considered equally, or the code quality metrics for the most recent code changes may be weighted more heavily in the computation of the code reputation score 132.

In a further embodiment, the reputation engine 130 may also utilize the quantitative aspects of the code ratings 138 regarding the code artifact 114 in the code ratings data 140 in the computation of the code reputation score 132. The weight given the various code ratings 138 in the computation of the code reputation score 132 for a code artifact 114 may further depend on the personnel reputation score 134 of the development personnel 102 providing the code rating. In addition, the weight given a particular code rating 138 regarding a code artifact 114 in the computation of the code reputation score 132 may diminish over time, making more recent code ratings 138 have a greater impact on the code reputation score 132 than older ratings.

The routine 200 proceeds from operation 206 to operation 208, where the reputation engine 130 further updates the personnel reputation scores 134 regarding development personnel 102 associated with the code change 118 and/or the associated code artifact(s) 114. For example, if a particular code change 118 is deployed to production, and the deployment must then be rolled back due to bugs in the code, the code quality metrics 120 regarding this event may be received by the reputation engine 130. The reputation engine 130 may utilize the received code quality metrics 120 to not only reduce the code reputation score 132 of the code artifact(s) 114 associated with the code change 118 but may also compute updated (lower) personnel reputation scores 134 for the developer of the offending code change, the person who reviewed the code change, the person or persons who tested the code change, and the like, as determined from an association of those development personnel 102 with the code change in the source code repository 112. Alternatively or additionally, lower code reputation scores 132 and personnel reputation scores 134 may be raised based on positive code quality metrics 120 received by the reputation engine 130.

Additionally, the reputation engine 130 may further update the personnel reputation scores 134 for development personnel 102 who have provided code ratings 138 in regard to the code artifact(s) 114 upon updating the code reputation scores 132 for the code artifacts, as further described above in regard to FIG. 1. For example, if a particular developer provides a code rating 138 indicating that a particular code artifact 114 containing a code change 118 has a five-star rating, and the received code quality metrics 120 indicate that the code change failed in production, then the personnel reputation score 134 for that developer in regard to his/her role as a code rater may be reduced by the reputation engine. Similarly, any positive code quality metrics 120 received by the reputation engine 130 may cause the personnel reputation score 134 for that developer to be increased. From operation 208, the routine 200 ends.

FIG. 3 illustrates one routine 300 for updating code reputation scores 132 and/or personnel reputation scores 134 from code ratings 138 provided by development personnel 102, according to a further embodiment described herein. For example, the routine 300 may be performed when a new code rating 138 is received regarding a code artifact 114 or other source code component in the source code repository 112. The routine 300 may be performed by the reputation engine 130, as described above in regard to FIG. 1. It will be appreciated that the routine 300 may also be performed by other modules or components executing on the application servers in the software development system 110, or by any other combination of modules and components.

The routine 300 begins at operation 302, where the reputation engine 130 receives new code rating 138 regarding a code artifact 114 in the source code repository 112. The code rating 138 may be received from development personnel 102 through the source code ratings module 136, according to one embodiment. As described above in regard to FIG. 1, a code rating 138 may include may include a quantitative rating for the code artifact 114, one or more tags for the code to be used for searching the source code repository 112, a qualitative analysis of the code, and the like.

From operation 302, the routine 300 proceeds to operation 304, where the reputation engine 130 updates the code reputation score 132 regarding the code artifact 114 identified in the received code rating 138. As further described above in regard to FIG. 1, the reputation engine 130 may utilize the code quality metrics 120 collected in regard to all code changes 118 associated with the code artifact 114 along with all code ratings 138 regarding the code artifact in the code ratings data 140 to compute the code reputation score 132 for that code artifact. The weight given the various code ratings 138 in the computation of the code reputation score 132 for a code artifact 114 may further depend on the personnel reputation score 134 of the development personnel 102 providing the code rating. In addition, the weight given a particular code rating 138 regarding a code artifact 114 in the computation of the code reputation score 132 may diminish over time, making more recent code ratings 138 have a greater impact on the code reputation score 132 than older ratings.

The routine 300 proceeds from operation 304 to operation 306, where the reputation engine 130 further updates the personnel reputation score 134 regarding the development personnel 102 that provided the received code rating 138, i.e. the "code rater." The personnel reputation score 134 of the code rater may be affected by the code reputation score 132 of all code artifacts 114 rated by the code rater along with the quantitative rating of the code artifacts provided. For example, if a particular developer provides a code rating 138 indicating a high quantitative rating for a code artifact 114 with a low code reputation score 132, then the personnel reputation score 134 for that developer may be negatively impacted. Similarly, providing a code rating 138 with a high quantitative rating for a code artifact 114 with a high code reputation score 132 may boost the personnel reputation score 134 for the code rater. In order not to allow code raters to boost their own reputations by providing high or low ratings to code having high or low code reputation scores 132, respectively, after a particular code artifact 114 has received a number of good or bad code ratings 138, subsequent code ratings with a similar assessment may be given less weight in the computation of the personnel reputation score 134 for the code rater. From operation 306, the routine 300 ends.

Figure 4:
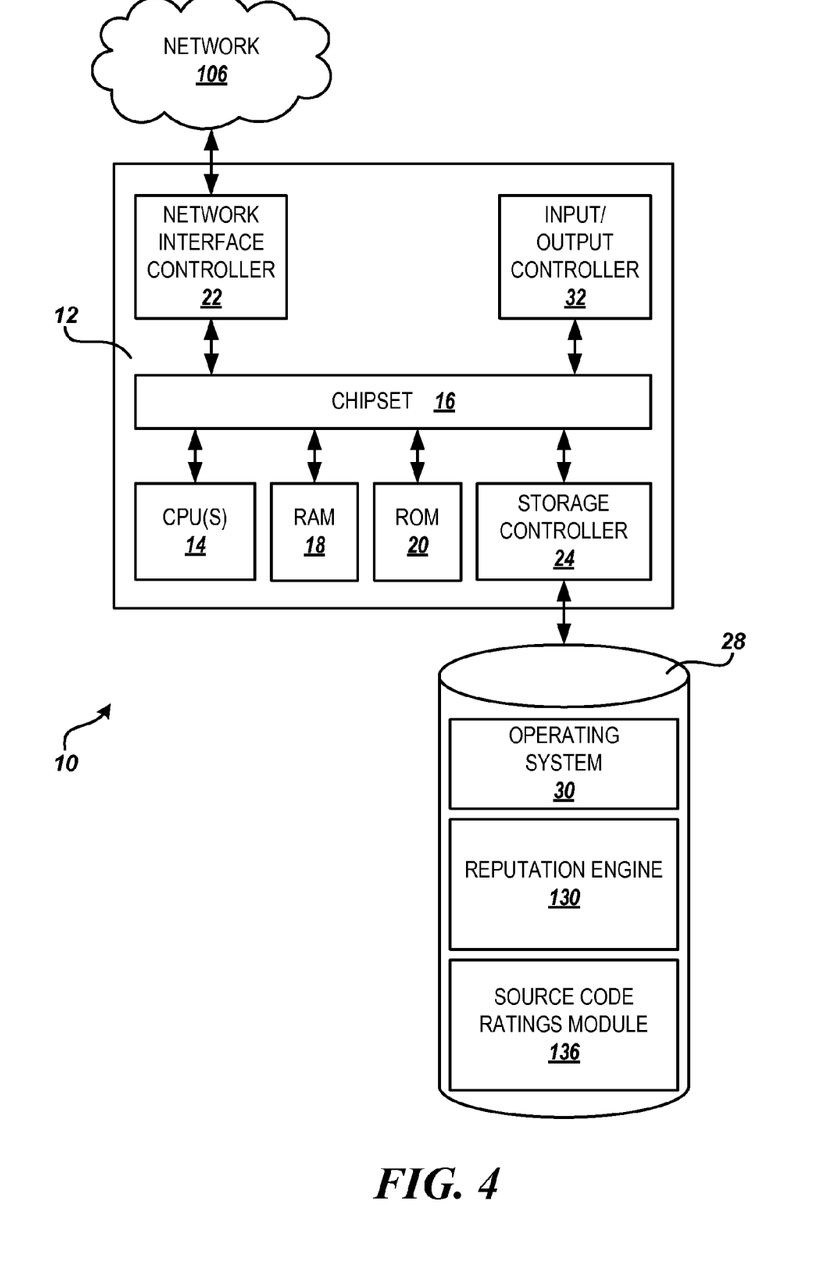
FIG. 4 is a computer architecture diagram showing an illustrative computer hardware architecture for computing devices described in embodiments presented herein.

FIG. 4 shows an example computer architecture 10 for a computer 12 capable of executing the software components described herein for providing an automated reputation system for source code and software development personnel, in the manner presented above. The computer architecture 10 shown in FIG. 4 illustrates a conventional server computer, workstation, desktop computer, laptop, PDA, electronic book reader, digital wireless phone, network appliance, set-top box, or other computing device, and may be utilized to execute any aspects of the software components presented herein described as executing in the software development system 110, on the development workstations 104, or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that help to startup the computer 12 and to transfer information between the various components and devices. The ROM 20 or NVRAM may also store other software components necessary for the operation of the computer 12 in accordance with the embodiments described herein.

According to various embodiments, the computer 12 may operate in a networked environment using logical connections to remote computing devices and computer systems through a network, such as a local-area network ("LAN"), a wide-area network ("WAN"), the Internet, or any other networking topology known in the art that connects the computer 12 to remote computers. The chipset 16 includes functionality for providing network connectivity through a network interface controller ("NIC") 22, such as a gigabit Ethernet adapter. For example, the NIC 22 may be capable of connecting the computer 12 to other computing devices, such as application servers, web servers, database servers, the development workstations 104, and the like, over the network 106 described above in regard to FIG. 1. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, or the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable medium to store and retrieve information, such as program modules, data structures, or other data. It should be appreciated by those skilled in the art that computer-readable media can be any available media that may be accessed by the computer 12, including computer-readable storage media and communications media. Communications media includes transitory signals. Computer-readable storage media includes volatile and non-volatile, removable and non-removable storage media implemented in any method or technology, but excludes transitory signals. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information.

The mass storage device 28 may store an operating system 30 utilized to control the operation of the computer 12. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 28 may store other system or application programs and data utilized by the computer 12, such as the reputation engine 130 or the source code ratings module 136, each of which was described above in regard to FIG. 1. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routines 200 and 300 for providing an automated reputation system for source code and software development personnel, as described above in regard to FIGS. 2 and 3.

The computer 12 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display device, such as a computer monitor, a flat-panel display, a digital projector, a printer, a plotter, or other type of output device. It will be appreciated that the computer 12 may not include all of the components shown in FIG. 4, may include other components that are not explicitly shown in FIG. 4, or may utilize an architecture completely different than that shown in FIG. 4.

Based on the foregoing, it should be appreciated that technologies for providing an automated reputation system for source code and software development personnel are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-readable storage medium having computer-executable instructions stored thereon that, when executed by a computer, cause the computer to:
   access a code quality metric for a code change made by one or more developers to an existing code artifact in a source code repository, wherein the code quality metric is automatically generated in response to a development lifecycle event, and comprises data associated with the code change collected from the development lifecycle event for measuring a quality of the code artifact;
   receive at least one code rating regarding the code artifact from a development personnel who is responsible for development or maintenance of a software system related to the code artifact, wherein the at least one code rating comprises a quantitative rating or a qualitative analysis for the code artifact provided by the development personnel;
   determine a weight for the at least one code rating based on a reputation of the development personnel from whom the at least one code rating regarding the code artifact is received, wherein the weight is further reduced according to a pattern of code ratings that have been received regarding the code artifact;
   generate a weighted code rating by applying the weight to the at least one code rating; and
   combine a value of the code quality metric for the code change and a value of the weighted code rating to generate a code reputation score for the code artifact, wherein the generating is performed by a computation unit.

2. The computer-readable storage medium of claim 1, wherein the development lifecycle event comprises one of:
   a review of the code change by a code reviewer as indicated by a source code control system;
   a testing of the code change by a software testing facility;
   an analysis of the code change by analysis tools;
   a deployment of the code change by a build facility or a deployment facility; or
   a failure of the code change in production recorded in a trouble ticket management facility.

3. The computer-readable storage medium of claim 1, having further computer-executable instructions stored thereon that cause the computer to compute a personnel reputation score for at least one of a developer, a reviewer or a tester of the code change based at least on the code quality metric.

4. The computer-readable storage medium of claim 1, having further computer-executable instructions stored thereon that cause the computer to:
  receive a new code rating regarding the code artifact from another development personnel;
  re-compute the code reputation score for the code artifact based at least on the code quality metric for the code change, the at least one code rating, and the new code rating; and
  compute a personnel reputation score for the development personnel who provided the new code rating based on the new code rating and the code reputation score for the code artifact.

5. The computer-readable storage medium of claim 1, having further computer-executable instructions stored thereon that cause the computer to perform a search of a source code repository to locate code artifacts containing a keyword and to sort the located code artifacts by the code reputation score computed for each of the located code artifacts.

6. The computer-readable storage medium of claim 1, wherein reducing the weight according to the pattern of the code ratings that have been received comprises:
  determining that one or more of past code ratings regarding the code artifact are similar to the at least one code rating; and
  in response to determining that one or more of past code ratings regarding the code artifact are similar to the at least one code rating, reducing the weight for the at least one code rating in the computation of the code reputation score for the code artifact.

7. A computer-implemented method of providing automated reputation scores for code artifacts in a source code repository, the method comprising executing instructions in a computer system to perform the operations of:
  collecting one or more code quality metrics for code changes made by one or more developers and associated with an existing code artifact in the source code repository, wherein the one or more code quality metrics for the code changes are automatically generated in response to development lifecycle events, and comprise data associated with the code changes collected from the development lifecycle events for measuring a quality of the code artifact;
  receiving at least one code rating regarding the code artifact from a development personnel who is responsible for development or maintenance of a software system related to the code artifact, wherein the at least one code rating comprises a quantitative rating or a qualitative analysis for the code artifact provided by the development personnel;
  determining a weight for the at least one code rating based on a reputation of the development personnel from whom the at least one code rating regarding the code artifact is received, wherein the weight is further reduced according to a pattern of code ratings that have been received regarding the code artifact;
  generating a weighted code rating by applying the weight to the at least one code rating; and
  combining a value of the one or more code quality metrics for the code changes and a value of the weighted code rating to generate a code reputation score for the code artifact, wherein the generating is performed by a computation unit.

8. The computer-implemented method of claim 7, wherein the development lifecycle events comprise one or more of:
  a review of the code change by a code reviewer as indicated by a source code control system;
  a testing of the code change by a software testing facility;
  an analysis of the code change by analysis tools;
  a deployment of the code change by a build facility or a deployment facility; or
  a failure of the code change in production recorded in a trouble ticket management facility.

9. The computer-implemented method of claim 7, further comprising:
  computing a personnel reputation score for another development personnel who is related to the code changes from the one or more code quality metrics regarding the code changes.

10. The computer-implemented method of claim 9, wherein the development personnel related to the code changes is at least one of the one or more developers of the code change, a reviewer of the code change, or a tester of the code change.

11. The computer-implemented method of claim 7, wherein the weight given to the at least one code ratings in the computation of the code reputation score for the code artifact is further determined from an age of the at least one code rating.

12. The computer-implemented method of claim 7, further comprising computing a personnel reputation score for the development personnel providing the at least one code rating based on the provided at least one code rating and the code reputation score for the code artifact.

13. The computer-implemented method of claim 7, wherein the code rating comprises a tag identifying a design pattern for the code artifact, and further comprising performing a search of the source code repository to locate code artifacts tagged with the design pattern and sorting the located code artifacts by the code reputation score computed for each.

14. The computer-implemented method of claim 7, wherein reducing the weight according to the pattern of the code ratings that have been received comprises:
  determining that one or more of past code ratings regarding the code artifact are similar to the at least one code ratings; and
  in response to determining that one or more of past code ratings regarding the code artifact are similar to the at least one code rating, reducing the weight for the at least one code rating in the computation of the code reputation score for the code artifact.

15. The computer-implemented method of claim 7, wherein the source code repository maintains relationships between the code changes and the code artifact.

16. A system for providing automated reputation scores for code artifacts comprising:
  one or more computing devices implementing a source code repository containing a code artifact and a reputation engine, the one or more computing devices configured to
  receive a code quality metric for a code change made by one or more developers and associated with the code artifact, wherein the code quality metric for the code change is automatically generated in response to a development lifecycle event, and comprises data associated with the code change collected from the development lifecycle event for measuring a quality of the code artifact,
  receive a code rating regarding the code artifact from a development personnel who is responsible for development or maintenance of a software system related to the code artifact, wherein the at least one code rating comprises a quantitative rating or a qualitative analysis for the code artifact provided by the development personnel, determine a weight for the code rating based on a personnel reputation of the development personnel from whom the code rating regarding the code artifact is received, wherein the weight is further reduced according to a pattern of code ratings that have been received regarding the code artifact, generate a weighted code rating by applying the weight to the code rating; and combine a value of the code quality metric for the code change and a value of the weighted code rating to generate a code reputation score for the code artifact.

17. The system of claim 16, wherein the reputation engine is further configured to compute a personnel reputation score for a development personnel related to the code change based at least on the code quality metric for the code change.

18. The system of claim 16, wherein the reputation engine is further configured to compute a personnel reputation score for the development personnel who provided the code rating based on the code rating and the code reputation score for the code artifact.

19. The system of claim 16, wherein reducing the weight according to the pattern of the code ratings that have been received comprises:
 determining that one or more of past code ratings regarding the code artifact are similar to the code rating; and
 in response to determining that one or more of past code ratings regarding the code artifact are similar to the code rating, reducing the weight for the code rating in the computation of the code reputation score for the code artifact.

20. The system of claim 16, wherein the source code repository maintains a relationship between the code change and the code artifact.

* * * * *